June 19, 1923.
E. H. AITKENS
1,459,430
RUBBER CUSHION WHEEL
Filed Sept. 13, 1922
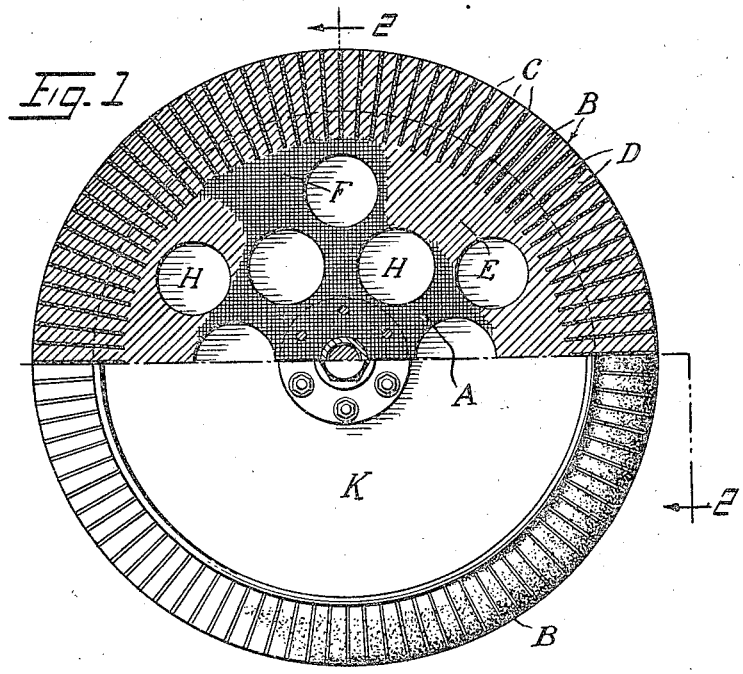
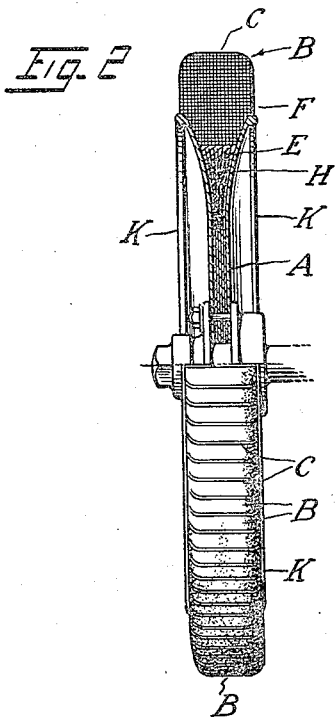
Eric Henry AITKENS
INVENTOR;
By Otto Munk
His Attorney.

Patented June 19, 1923.

1,459,430

UNITED STATES PATENT OFFICE.

ERIC HENRY AITKENS, OF SYDNEY, NEW SOUTH WALES, AUSTRALIA.

RUBBER-CUSHION WHEEL.

Application filed September 13, 1922. Serial No. 587,924.

*To all whom it may concern:*

Be it known that I, ERIC HENRY AITKENS, a subject of the King of Great Britain and Ireland, residing at 414 Elizabeth Street, Sydney, New South Wales, Australia, have invented certain new and useful Improvements in Rubber-Cushion Wheels, of which the following is a specification.

This invention relates to rubber tread wheels for common road vehicles, and it consists in improvements in that type of such wheels in which a moulded disc wheel body built up of rubberized fabric and rubber is demountably carried between dished metal cheeks which are fixed to the hub and afford lateral rigidity to the structure.

In known methods of constructing wheels of this type, canvas or like fabric carcass material has been disposed in discs extending from the central portion of the wheel to the tread surface. The tread was thus constituted of parallel layers of canvas separated by greater or less thicknesses of rubber between such layers, in planes approximately at right angles to the wheel axis. The tread was therefore not bonded transversely and side chipping and tread splitting consequently occurred, and the lateral rigidity of the toroid constituting the tread was found insufficient.

According to my invention the torus and the underlying ring together forming the tread portion of the structure is built up of rubber with canvas fabric inlays embedded therein in radial order transversely to the plane of the wheel. The canvas inlays extend from cheek to cheek and from face to base of the tread and serve the triple purposes of bonding the tread and stiffening it transversely, and offering a more effective wearing surface than is obtained when the direction of the canvas lay is in the plane of the wheel's rolling movement. The core portion of the wheel body is built up of a pack of canvas fabric discs flared laterally towards the base of the tread, with rubber filling between the canvas layers homogeneous with the rubber substance of the tread. This core is perforated with large holes symmetrically arranged to balance the wheel and lighten it. Dished plates embrace the opposite sides of the core and the base of the tread cheeks; these plates are bolted or otherwise fixed to the wheel hubs. The complete rubberized canvas structure is compressed in a mould and vulcanized according to known methods in the tyre manufacturing art.

In the accompanying drawings,—

Fig. 1 is a halved sectional elevation of a road vehicle wheel constituted of a core disc with toroid tread embraced between a pair of dished cheek plates; and Fig. 2 is a halved transverse section and end view of the same, taken on the line 2—2, Fig. 1.

The core portion A of the rubberized fabric structure is built up of a pack of superposed discs of rubberized canvas which are splayed apart towards their peripheral portions where they meet the base of the tread B. Alternatively the core portion may consist of milled cork and rubber compound, its function being to form for the tyre tread a bedding or bottoming having some resilience. The tread is constructed of rubber having inlays C of canvas fabric embedded in it. The rubber contained in the tread is integral with the rubber filling E which is contained between the layers F of core canvas.

The rubberized canvas inlays C and the canvas core discs A are all perforated before assembling and vulcanization by punching holes measuring say ¼" diameter more or less through them, at centerings sufficiently far apart (say twice to three times the diameter of the holes) to preserve the substance of the canvas, with the object that during the building up with rubber and in the vulcanization the rubber masses at either side of the individual canvas members will be integrally interconnected (rubber riveted) through these perforations. A complete bonding of the canvas and the rubber in the wheel body is thus ensured.

A wheel body thirty inches in diameter is in practice built up of a sufficient number of layers of rubberized canvas or a sufficient mass of rubber-cork compound to form a core one-inch to one-and-a-quarter inches in minimum thickness, and a mass of rubber to form a tread band say three inches wide and six inches deep, the radially disposed canvas inlays in the tread band being located at equal intervals one-quarter inch to one-half inch apart. The dished disc cheeks for such a wheel would measure about twenty-four inches in diameter, so that about one-half the depth of the inlay-reinforced tread band would be embraced within their peripheral portions.

It is always preferred that the core shall be formed for the full depth between the tread base and the wheel hub, as shown in the drawing, but it is to be understood that it may be formed with a central "eye" of larger diameter than the hub and that the annular space around the hub within the core eye may be filled with a metal composition, or wooden filler forming a centering and bottom for the core. The tread portion of the wheel should be served over with a rubber skin before vulcanization, thereby to shroud the ends of the canvas inlays and to offer a smooth clean finish.

After vulcanization circular discs H are cut out of the core portion of the wheel body with the double object of lightening the structure and balancing it, leaving a sufficiency of material for ensuring mechanical stability. The rubber-and-fabric wheel body and tyre thus formed is clamped between the dished cheek discs K.

Owing to the flared sectional shape of the wheel body below the base of the tread portion of it, and the opening up of the core portion of it by the cutting out of the discs H the tread is resilienly supported in a radial direction and is rigidly supported laterally between the cheek discs K so that when the wheel is heavily loaded only negligible lateral flexure of the tread is possible in consequence of the rigidity of the cheek disc supports around its base and the rigidity imparted by the canvas inlays; but the tread may depress radially more or less from its place of contact with the road. The canvas inlays C render the tread resistant to edge chipping and longitudinal splitting.

What I claim as my invention and desire to secure by Letters Patent is:—

1. A road wheel body adapted to be demountably fixed between dished metal disc cheeks, said body having a resilient rubberized core portion splayed laterally towards the peripheral edge, a tread portion of the rubber moulded integrally with rubber contained in the core structure, and fabric reinforcing inlays disposed transversely in a radial direction in said tread, the complete structure being finally vulcanized.

2. A road wheel body constructed of canvas and vulcanized rubber and adapted to be demountably fixed between dished metal disc cheeks, characterized in that the tread portion of it is composed of vulcanized rubber containing symmetrically distributed transversely and radially disposed inlays of canvas.

3. A road wheel constructed of a canvas and vulcanized rubber structure adapted to be demountably fixed between dished metal disc cheeks, and characterized in that the tread portion of it is moulded in vulcanized rubber reinforced transversely, integrally with a core portion which consists of a plurality of discs of rubberized canvas and is flared outwardly towards the tread base.

4. A road wheel according to claim 1 wherein the canvas discs and canvas inlays are perforated before assembling to allow the rubber on either side of them respectively to join and "rivet" the structure.

5. A road wheel according to claim 3, wherein the rubberized canvas core is symmetrically apertured in the area embraced between the metal cheek plates.

In testimony whereof I affix my signature in presence of two witnesses.

ERIC HENRY AITKENS.

Witnesses:
THOMAS K. FLANAGAN,
W. G. HUMPHREYS.